(12) United States Patent
McClaine et al.

(10) Patent No.: US 7,790,013 B2
(45) Date of Patent: Sep. 7, 2010

(54) STORING AND TRANSPORTING ENERGY

(75) Inventors: Andrew W. McClaine, Lexington, MA (US); Kenneth Brown, Reading, MA (US)

(73) Assignee: Safe Hydrogen, LLC, Lexington, MA (US)

( * ) Notice: Subject to any disclaimer, the term of this patent is extended or adjusted under 35 U.S.C. 154(b) by 540 days.

(21) Appl. No.: 11/392,149

(22) Filed: Mar. 29, 2006

(65) Prior Publication Data
US 2007/0227899 A1   Oct. 4, 2007

(51) Int. Cl.
    C25B 1/02    (2006.01)
    H01M 6/36    (2006.01)
    B01J 19/00   (2006.01)
    C01B 3/00    (2006.01)

(52) U.S. Cl. .............. 205/637; 429/17; 423/658.2; 422/198

(58) Field of Classification Search ............ 205/637; 429/17; 423/658.2; 422/198
See application file for complete search history.

(56) References Cited

U.S. PATENT DOCUMENTS

| | | | | |
|---|---|---|---|---|
| 4,555,395 | A | * | 11/1985 | Sirovich et al. ............ 423/644 |
| 5,162,108 | A | * | 11/1992 | Bogdanovic ................ 423/647 |
| 6,368,492 | B1 | * | 4/2002 | Narayanan et al. .......... 205/638 |
| 6,572,836 | B1 | * | 6/2003 | Schulz et al. ............ 423/648.1 |
| 6,745,801 | B1 | * | 6/2004 | Cohen et al. ................ 141/231 |
| 2002/0100682 | A1 | * | 8/2002 | Kelley et al. ................ 204/266 |
| 2002/0166286 | A1 | * | 11/2002 | McClaine et al. ......... 48/197 R |
| 2004/0016769 | A1 | * | 1/2004 | Redmond ....................... 222/3 |

OTHER PUBLICATIONS

Sinha et al., "Metal Hydride Slurry Hydrogen Delivery System", TIAX LLC, Fuel Cell Seminar, San Antonio, TX Nov. 4, 2004.

* cited by examiner

*Primary Examiner*—Harry D. Wilkins, III
*Assistant Examiner*—Nicholas A. Smith
(74) *Attorney, Agent, or Firm*—Fish & Richardson P.C.

(57) ABSTRACT

Among other things, hydrogen is released from water at a first location using energy from a first energy source; the released hydrogen is stored in a metal hydride slurry; and the metal hydride slurry is transported to a second location remote from the first location.

22 Claims, 3 Drawing Sheets

STORING AND TRANSPORTING ENERGY

STATEMENT AS TO FEDERALLY-SPONSORED RESEARCH

This invention was made with U.S. Government support under Contract No. DE-FC36-04GO14011 awarded by the Department of Energy. The Government has certain rights in this invention.

BACKGROUND

This description relates to storing and transporting energy.

Energy in the form of electricity can be stored in the form of hydrogen, for example, by applying the electricity to an electrolysis process to disassociate the hydrogen from oxygen in water. Energy in the form of heat can also be stored in the form of hydrogen by using a thermal conversion process to dissociate the hydrogen from oxygen in water.

Hydrogen can be transported safely and easily by incorporating it into a metal hydride. Later, the hydrogen can be released by mixing water with the metal hydride and used to provide energy, for example, to a car.

SUMMARY

In one aspect, methods are provided that include generating hydrogen using electricity or heat, and combining the hydrogen with a pumpable fluid to form a is pumpable hydrogen storage fluid. The pumpable hydrogen storage fluid is not subject to significant hydrogen evolution at room temperature and pressure.

In one aspect, methods are provided that include releasing hydrogen from water at a first location using energy from a first energy source, storing the released hydrogen in a metal hydride slurry, and transporting the metal hydride slurry to a second location remote from the first location.

In one aspect, systems are provided that include an electrolyzer to extract hydrogen from water using energy from a first energy source at a first location and a charging device coupled to the electrolyzer. The charging device has a slurry inlet, a slurry outlet, and a heating device capable of heating a slurry in the charging device to at least about 320° C.

In one aspect, systems are provided that include an electrolyzer including electrical terminals and a hydride slurry charging device coupled to the electrolyzer.

In one aspect, systems are provided that include a first device to produce hydrogen using electricity from a first energy source, a metal hydride slurry charging device coupled to the first device, a metal hydride slurry storage vessel coupled to the metal hydride slurry charging device, and a pump to pump a slurry from the metal hydride slurry charging device to the metal hydride slurry storage vessel.

Implementations may include one or more of the following.

In some embodiments, the pumpable inert fluid comprises a reversible hydride former. In some embodiments, the reversible hydride former includes a reversible metal hydride former, (e.g., magnesium) and/or a reversible metal alloy hydride former.

In some embodiments, the methods further include releasing hydrogen from the metal hydride slurry to form hydrogen and a metal hydride slurry that is at least partially depleted.

In some embodiments, the methods include transporting the partially depleted metal hydride slurry from the second location to the first location, e.g., for recharging the partially depleted metal hydride slurry. For example, the partially depleted metal hydride slurry can in some instances be recharged by releasing energy from water at the first location using energy from the first energy source, and storing the released hydrogen in the depleted metal hydride slurry to form the metal hydride slurry. The metal hydride slurry can in some embodiments be depleted and recharged for at least 50 cycles.

In some embodiments, the first energy source can include a renewable energy source (e.g., wind, hydroelectric, geothermal, ocean power, solar, and/or combinations of these). The first energy source can be used in some embodiments to release hydrogen from water, and the hydrogen can be stored in a metal hydride slurry at the first location. In some embodiments, the metal hydride slurry can be transported via a carrier (e.g., a rail car, a truck, a tanker, a pipe, and any combination of these) from the first location to a second location. In some embodiments, the hydrogen that is released from the metal hydride slurry (e.g., at the second location) can be utilized as an energy source (e.g., in a fuel cell). In this fashion, energy from the first energy source can be effectively stored and transported to a second location. In some embodiments, the first location has a first energy demand, the second location has a second energy demand, and the first energy demand is lower than the second energy demand.

In some embodiments, the metal hydride slurry comprises magnesium, magnesium hydride, and mineral oil. In some embodiments, the metal hydride slurry further comprises a dispersant.

In some embodiments, the systems are capable of maintaining a pressure in the charging device of at least about 150 psia. In some embodiments, the charging device comprises a pump to pump a slurry from the charging device through the slurry outlet, e.g., to a storage container coupled to the charging device slurry outlet. In some embodiments, the charging device includes a regulator to maintain a temperature of a slurry contained in the charging device at no more than about 350° C.

In some embodiments, the systems include a discharge device including a heating device capable of heating a hydride slurry contained in the discharge device to at least about 370° C. In some embodiments, the discharge device includes a hydrogen outlet through which hydrogen evolved from a hydride slurry can pass.

In some embodiments, the first device of the system includes an electrolyzer.

In some embodiments, the systems include a pump coupled to the storage vessel to transfer a slurry from the metal hydride slurry storage vessel to a slurry carrier (e.g., a truck, a boat, a rail car, a pipe, or any combination of these).

In some embodiments, the systems include a metal hydride slurry discharge device that removes hydrogen from a metal hydride slurry.

In general, other aspects include the above features and aspects alone and in other combinations, expressed as methods, apparatus, systems, program products, and in other ways.

Among the advantages of these and other features and aspects are one or more of the following.

Energy can be stored in the hydrogen at a place where the energy is readily available, for example, from wind and/or the sun, but the demand for energy is relatively low, and transported to a place where energy demand is high.

Other features and advantages will be apparent from the description and from the claims.

DESCRIPTION

Generally, systems and methods are provided in which energy is stored and/or transported in the form of hydrogen. For example, energy in the form of hydrogen can be stored by incorporating the hydrogen into a reversible metal hydride slurry, which is a slurry that includes a component (e.g., a metal or metal alloy) that can accept hydrogen atoms (can be hydrided) and can give up hydrogen atoms (can be dehydrided) in a reversible fashion, depending on the conditions (e.g., heat and/or pressure) to which the slurry is subject. Slurries that include a reversibly hydridable component can generally be described as "charged," in which a substantial amount (e.g., 80% or more) of the hydridable component is hydrided; "depleted," in which a substantial amount (e.g., 80% or more) of the hydridable component is not hydrided; or "partially charged," in which the slurry contains both hydrided and non-hydrided components, with the hydrided component being generally present in an amount between about 20% and 80% of the total amount of hydridable component. Typically 85% to 95% of the amount of the hydridable component will be hydrided when charged and 5% to 15% will be hydrided when depleted. In a worst acceptable case, likely at least 70% would be hydrided when charged and 5% when depleted. In general, a "charged" slurry can include some level of hydridable component that is not hydrided, and a "depleted" slurry can include some level of hydridable component that is hydrided. In determining whether a slurry is considered charged or depleted, commercial factors can be considered; for example, a slurry can be considered "charged" when it has enough hydrided material to provide a desired amount of energy from that hydrogen when it is subject to hydrogen evolution. Factors such as the cost and time of hydriding the slurry, cost of transportation of the slurry to the site of hydrogen evolution, and the cost of alternative sources of energy at the site of hydrogen evolution can be considered in determining when a slurry is charged.

Figure 1:
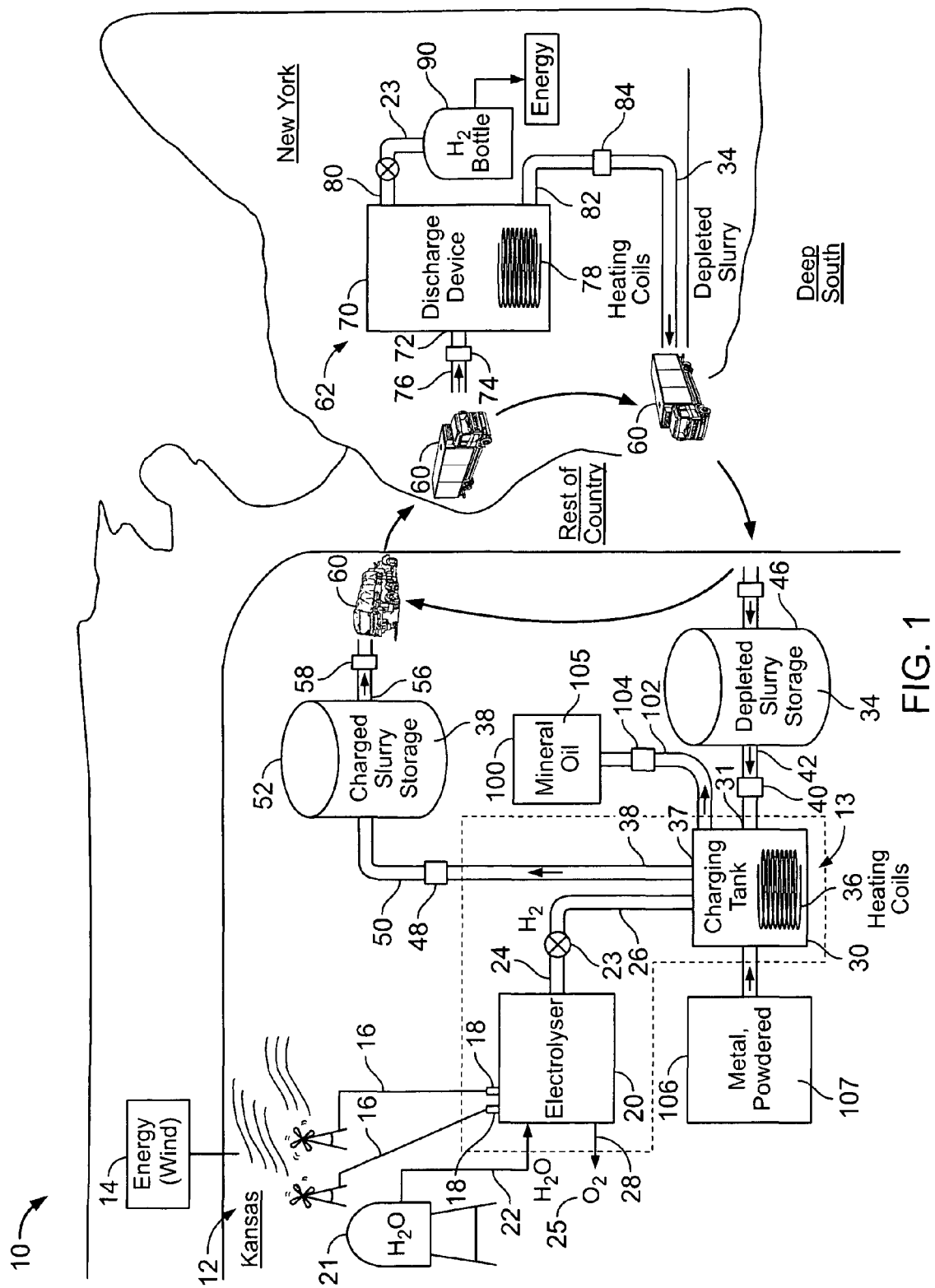
FIG. 1 is a schematic diagram of storing and transporting energy.

In the example of storing and transporting of energy 10 shown in FIG. 1, energy available at a first location 12 (in this case, a windmill farm in Kansas) is stored in a safe, easily handled transportable medium (in this case, hydrogen in a rechargeable metal hydride slurry) to a second location (in this case, New York) where the energy is used, e.g., in cars that are able to burn hydrogen as a fuel.

At a first location 12, wind causes rotors 19 of windmills 15 to spin, driving generators 17 to produce electricity. The electricity is carried on cables 16 to electrical terminals 18 of an electrolyzer 20. The electrolyzer is part of an energy charging system 13 that also includes a charging device 30.

Using the electricity, the electrolyzer 20 separates water into hydrogen gas 23 and oxygen gas 25. The water is provided from a source 21 through a pipe 22. The hydrogen gas 23 is passed through a hydrogen gas outlet 24 and a pipe 26 into the charging device 30. The oxygen gas 25 is vented from the electrolyzer 20 through an oxygen gas outlet 28, where it can be collected for further use or vented to the atmosphere.

In some examples, the electrolyzer 20 pumps the hydrogen gas 23 into the charging device 30 under pressure (e.g., at least about 50 psia [pounds per square inch absolute]) and the contents of the charging device are maintained under pressure. The pressure could be in a range of about 100 psia or more, 150 psia or more, 200 psia or more, 250 psia or more, 500 psia or more, 1000 psia or more, or 1500 psia or more. The pressure level is set based on the ability of the charging device to withstand pressure and handle the heat generated by the reaction. The reaction between the metal hydride and the hydrogen will produce heat and charged metal hydride. The reaction rate of the depleted metal hydride with hydrogen is typically faster with higher pressure. An optimal system could use a hydrogen pressure that maximizes the system production rate while minimizing the system cost. A higher production rate will typically require a smaller and possibly less expensive charging device. On the other hand, a rapid reaction rate might produce so much heat that the heat removal system becomes costly. An optimal system could balance the costs to yield a minimum cost design. One advantage of the metal hydride being in slurry form is that the slurry can be stirred to aid in heat transfer.

In some examples, not illustrated in FIG. 1, the hydrogen gas 23 is collected in a hydrogen gas tank where it is pressurized before being delivered to the charging device 30. For example, if the cost of pressurizing the hydrogen to a particular pressure is less than the cost of using an electrolysis device that operates at that pressure, or if the hydrogen source is at a lower pressure than is required by the charging device, a pressurized hydrogen tank can provide hydrogen at the necessary pressure.

In addition to the hydrogen, the pressurized charging device 30 receives a stream of depleted reversible metal hydride slurry 34. A depleted reversible metal hydride slurry can be a slurry that has not yet been hydrided (e.g., a newly-formed slurry) and/or a slurry that has been at least partially dehydrided. Each is discussed in greater detail below. The depleted reversible metal hydride slurry, sometimes simply called a depleted slurry, metal hydride slurry, or slurry, includes both metal hydride and elemental metal in a form that is able to accept additional hydrogen to form metal hydride. The proportion of metal hydride to elemental metal in the slurry can be 1.2% or more by weight.

Other components can be included in the depleted metal hydride slurry, for example, a carrier liquid, such as an organic carrier, and/or a dispersant for stabilizing the slurry, such as a triglyceride or polyacrylic acid (~1%) or oleic acid (~0.125%). The depleted slurry is drawn by a pump 40 through a pipe 42 from a depleted reversible metal hydride slurry source (for example, a depleted metal hydride slurry storage device 46) and forced through a depleted metal hydride slurry inlet 31 into the charging device 30.

The slurry in the pressurized charging device 30 is then heated using heating coils 36. When the slurry is heated, the metal hydride in the slurry is able to be further charged with hydrogen gas 23, whereby the amount of hydrogen in the form of a metal hydride in the metal hydride slurry is increased. For magnesium hydride, the reaction rates are very slow until the temperature of the hydride is above about 280° C., so heating the magnesium hydride to this temperature can speed up the initial reaction. The rate then generally quickens, and the temperature and/or pressure can be lowered to control the reaction rate. By this process, the depleted metal hydride slurry becomes a charged metal hydride slurry 38, as described below. The temperature to which the pressurized slurry is heated for charging can be within a wide range, for example, in the range of from about 50° C. to about 350° C., depending on the metal hydride used in the slurry. For magnesium hydride, the charging range is from about 250° C. to about 400° C. (e.g., from about 260° C. to about 300° C.). The preferred temperature range will generally depend on the rate of reaction between the hydrogen and the depleted metal hydride.

Generally, the temperature and pressure for hydriding the slurry will depend on each other, and will depend on the type of metal being used in the slurry. For example, magnesium hydride requires relatively high temperatures and pressures to hydride the slurry at an acceptable rate; the equilibrium temperature of magnesium hydride at 1 atmosphere is 279° C. Other metal hydrides can typically achieve similar reaction rates at lower temperatures and/or pressures.

After the charging, the charged reversible metal hydride slurry 38 is cooled, e.g., to room temperature. The cooled charged metal hydride slurry 38 does not release a significant amount of hydrogen while its temperature remains within a cool range, and is therefore safe to store and/or transport. A "significant amount" of hydrogen is an amount large enough to significantly affect the amount of energy available at the site of hydrogen evolution or the cost-effectiveness of using the slurry as a source of energy, or enough to create storage and/or transportation difficulties, for example, due to increases in pressure resulting form the production of hydrogen. For example, in some embodiments, the cooled charged metal hydride slurry releases no more than about 1% of its total hydrogen (e.g., no more than about 10%, no more than about 1%, or no more than about 0.1% of its total hydrogen). In some cases, it is believed that the amount of hydrogen release would be less (even considerably less than) 0.1%. The available range of temperatures at which the charged metal hydride slurry does not release a significant amount of hydrogen depends on the metal hydride used in the slurry. For magnesium hydride, the slurry will not produce significant amounts of hydrogen at temperatures below about 200° C. (e.g., below about 100° C., below about 80° C., below about 60° C. or below about 40° C.). Other reversible hydrides typically must be kept cooler.

Once the slurry has been charged, a pump 48 pumps the charged slurry 38 from a charged metal hydride slurry outlet 37 through a pipe 50 to a charged slurry storage device 52, where the charged metal hydride slurry can be stored indefinitely. The charged slurry storage device 52 has an outlet 56 to allow the slurry to be withdrawn by a pump 58 into a slurry carrier 60, here a tanker truck. The slurry carrier 60 could be anything capable of moving a fluid over a distance, such as automotive vehicles, rail cars, ships, barges, and pipes or other conduits. The carrier could be trucks of the kind that are used to transport gasoline. The pump 58 can be part of a service station that is dedicated to serving trucks from a single distributor or can be available to serve trucks of multiple distributors.

The slurry carrier 60 transports the charged metal hydride slurry 38, including the energy stored in the hydride in the form of hydrogen, from the first location 12 to the second location 62.

At the second location, a station for offloading the transported slurry includes a pipe 76 through which a pump 73 withdraws the slurry from the transporter and pumps it to a charged slurry storage tank 75. When hydrogen is needed, charged slurry is pumped by pump 74 from the charged slurry storage tank 75 through pipe 77 to a slurry inlet 72 and into a discharge device 70.

The discharge device contains a heater 78 (e.g., a heating coil) for heating the slurry to a temperature at which the metal hydride of the slurry releases hydrogen. The heating temperature is dependent on the discharge characteristics of the metal hydride in the slurry. For magnesium hydride, the heating temperature is from about 250° C. to about 400° C. (e.g., from about 290° C. to about 370° C. or from about 320° C. and 360° C.). Other hydrides can have different temperatures at which they release hydrogen. Generally, the temperature will be least about 150° C. (e.g., at least about 80° C., at least about 100° C., at least about 125° C., at least about 175° C., at least about 200° C., at least about 225° C., at least about 250° C., at least about 275° C., at least about 300° C., at least about 325° C., at least about 350° C., at least about 375° C., or at least about 390° C.) and/or at most about 400° C. (e.g., at most about 390° C., at most about 375° C., at most about 350° C., at most about 325° C., at most about 300° C., at most about 275° C., at most about 250° C., at most about 225° C., at most about 200° C., or at most about 175° C.).

The discharge device will typically operate at a pressure determined by the discharge characteristics of the metal hydride and the system economics. For magnesium hydride, the highest discharge rates occur with a pressure near atmospheric pressure or lower. However, hydrogen compressors typically cost less if the hydrogen is provided at a pressure ranging from 30 psia to 100 psia. In this case, the discharge device may be operated in the range of 30 to 100 psia to reduce the cost of the hydrogen compressor. The pressure range will typically be selected to minimize the cost of the system. For example, if the hydrogen is to be consumed by a fuel cell, the pressure required may only be 16 to 20 psia. In this case, the discharge device will likely be operated at a pressure of 16 to 20 psia to eliminate the need for a hydrogen compressor.

The discharge device is designed to exclude air and water, specifically oxygen and water. The charging device is also designed to exclude air and water as these materials can react with the metal hydride and prevent it from absorbing or desorbing hydrogen.

As the charged metal hydride slurry 38 is heated and the hydrogen gas 23 is discharged, the slurry becomes a depleted metal hydride slurry 34 (a metal hydride slurry that includes less than a significant amount of hydrogen, for example, because some of the hydrogen has evolved from the slurry or because the slurry has been newly formed and has not been hydrided). The depleted reversible slurry is withdrawn by a pump 84 through a gas outlet 80 into a slurry carrier 60 (which could be, for example, the same trucks used to carry the charged slurry) for transport back to the first location 12 (or another recharging facility) for recharging.

The hydrogen gas 23 that is discharged from the charged metal hydride slurry 38 is vented through a gas outlet 80 and collected, e.g., bottled in a hydrogen bottle 90. The bottled hydrogen can be subsequently used as a source of energy, effectively transporting the energy from, for example, the wind farm in Kansas to, for example, New York, where the energy demand is higher than in Kansas. The bottled hydrogen could be used, for example, to power fuel cells in a vehicle. For example, the hydrogen can be discharged from the bottle into a fuel cell in a vehicle at a service station, or the bottle itself can be placed in a vehicle and can be incrementally fed into a fuel cell in the vehicle. The hydrogen can be bottled as a gas or as a liquid. In some cases, the hydrogen can be put to a use other than as an energy source. For example, the hydrogen can be used in laboratory work as a carrier gas for a gas chromatograph, as a reactant in a chemical reaction requiring hydrogen, or as a welding gas, e.g., to replace acetylene.

In some embodiments, the rechargeable metal hydride slurry can be used as an energy source for a vehicle directly, rather than as a source for bottled hydrogen. For example, the rechargeable metal hydride slurry can be pumped directly into a vehicle, e.g., into a storage tank in a vehicle. The vehicle can have a discharge device located within the vehicle, allowing for the evolution of hydrogen for use as a fuel source in the vehicle. In some embodiments, the vehicle could also have a charging device, such that the rechargeable metal hydride slurry can be recharged within the vehicle itself. Hydrogen from a hydrogen source can be pumped into the charging device in the vehicle to hydride the slurry.

In some implementations, the reversible metal hydride slurry can initially be formed at the first location 12, e.g., in the charging device 30. For that purpose, an inert liquid (for example, mineral oil) 105 can be withdrawn by a pump 104 from an inert liquid tank 100 through an inert liquid pipe 102 and into the charging device 36. Also included is a storage container 106 for storing a metal hydride former 107, for example, an elemental metal in powdered form. The storage container 106 is coupled to the charging device 30 through a conduit for transfer into the charging device 30. Alternatively, one or both of the storage container 106 and the inert liquid device 100 can be uncoupled to the charging device; then the inert liquid 105 and/or the hydride former 107 can be added to the charging device 30 by hand. Other slurry components, such as, e.g., a dispersant and/or a hydride catalyst, can be stored and added to the charging device 30 to form the slurry. The hydride former 107, inert liquid 105, and optional additional ingredients can be combined in the charging device 30 to form an initial depleted slurry 34.

In some examples the reversible metal hydride slurry can initially be formed at another location and trucked to the first location 12 for use.

Although only one first location having one charging device and one second location having one discharge device are shown in FIG. 1, the first location may include multiple charging devices, the second location may include multiple discharge devices, and there may be multiple first locations and second locations forming a distribution network for energy derived at some locations and used at other locations.

In some examples, the slurry generally includes a carrier liquid, such as an organic carrier, a dispersant, such as a triglyceride, for stabilizing the slurry, and a reversible metal hydride and/or reversible metal hydride former (i.e., the metal and/or alloy of the metal hydride in elemental form) dispersed in the carrier liquid. The concentration of the hydride and/or hydride former in the slurry is typically in the range of 40 to 80 wt % (e.g., 50 to 70 wt % or 55-60 wt %). The concentration is generally dependent on the metal hydride selected for use in the slurry. The use of denser metal hydrides will result in higher metal hydride concentrations than will the use of less dense metal hydrides. Dense metal hydrides are metal hydrides having a density of at least about 1 gm/mL, and include, for example, lanthanum penta-nickel, while less dense metal hydrides have a density of no more than about 1 gm/mL, and include, for example, lithium hydride. Magnesium hydride slurries can have hydride concentrations of at least about 50 wt % (e.g., at least about 55 wt %, at least about 60 wt %, at least about 65 wt %, at least about 70 wt %, or at least about 75 wt %), and/or at most about 80 wt % (e.g., at most about 75 wt %, at most about 70 wt %, at most about 65 wt %, at most about 60 wt %, or at most about 55 wt %). Generally, higher percentages yield higher energy densities (i.e., the amount of energy that can be obtained from given volumes of slurry) while being generally more viscous and can require more force to pump, while lower percentages are typically less viscous, requiring less force to pump, but yielding a lower energy density.

The slurry can be safely stored and transported, and the hydrogen may be easily extracted for use as a fuel. The slurry is generally not highly flammable or combustible and may be safely handled, stored, and transported. The slurry is stable at normal environmental temperatures and pressures, for example, such that hydrogen does not dissociate from the hydride and evolve. Because it is a liquid, the slurry can easily be pumped through conduits and into storage tanks, transportation devices, and/or charging and discharging devices.

The slurry includes a carrier liquid, e.g., an inert liquid in which the metal hydride and/or reversible metal hydride former is suspended. An "inert liquid" includes a liquid that does not chemically react either with $H_2$ or with the metal hydride and/or reversible metal hydride former at the temperatures and pressure in which it will be used, and that will not deactivate the surface of the hydride or hydride former in relation to its catalytic capability to dissociate the $H_2$ molecule into atoms or to prevent recombination of the atoms into the $H_2$ molecule. The inert liquid has the capacity to dissolve measurable amounts of hydrogen.

The carrier liquid in some examples is an organic carrier liquid, such as mineral oil or a low molecular weight hydrocarbon, for example, an alkane (e.g., pentane or hexane). Other carrier liquids could include fluorinated hydrocarbons, such as perfluorodecane, silicone based solvents, saturated organic liquids, such as undecane, iso-octane, octane and cyclohexane, or mixtures of high boiling point hydrocarbons such as kerosene, and mixtures of them.

In some examples, the inert carrier liquid is a non-toxic light mineral oil that exhibits a high flash point, in the range of about 154° C. to about 177° C. and a viscosity in the range of about 42 Saybolt Universal seconds (S.U.s) to about 59 S.U.s. The mineral oil is not chemically reactive with metal hydrides, produces relatively low vapor pressure, and remains liquid through a temperature range of about −40° C. to 200° C. The carrier liquid renders the slurry pumpable and, as a safe liquid, simple to store or transport. The carrier can act as a barrier between the hydride and atmospheric water, reducing the reaction of the two to form a hydroxide, which can reduce the ability of the slurry to store and release hydrogen. The use of a slurry permits easy refueling, as by topping off a tank. Other carriers may work well, including carriers that are without water bonds and preferably are without OH bonds. Silicone-based carriers may also work for slurries.

In some cases, the slurry includes a dispersant. The dispersant can be, for example, a triglyceride dispersant, which sterically stabilizes the slurry. The triglyceride dispersant can be, for example, triglyceride of oleic acid, or triolein. Other dispersants that could be used include polymeric dispersants, e.g., Hypermer™ LP1. The dispersant can be polymeric dispersant. A combination of triglyceride and polymeric dispersant can also be used and may be particularly useful if the hydride is magnesium hydride. Other dispersants include oleic acid, polyacrylic acid, and hexadecyltrimethylammonium bromide (CTAB). The dispersant can in some cases be present at concentrations of at least about 0.05% (e.g., at least about 0.1%, at least about 0.5%, at least about 0.75%, at least about 1.0%, at least about 1.5%, at least about 2.0%, at least about 2.5%, at least about 3.0%, or at least about 3.5%) and/or at most about 4.0% (e.g., at most about 3.5%, at most about 3.0%, at most about 2.5%, at most about 2.0%. at most about 1.5%, at most about 1.0%, at most about 0.75%, at most about 0.5%, or at most about 0.1%). For example, a blend including magnesium hydride, light mineral oil, and a mixture of 0.0625% CTAB with 1% poly(acrylic) acid forms a stable slurry. The CTAB makes the slurry more flowable and the poly(acrylic) acid helps to keep the magnesium hydride particles in suspension. One function of the dispersant is to attach to the particles of hydride, increasing the drag of the particle in the carrier fluid thus helping to prevent settling. The dispersant also helps to keep the particles from agglomerating. The dispersant promotes the formation of the slurry and the stabilization of the hydride into the mineral oil. Dispersants can in certain embodiments also have surfactant properties that may also be useful in the formation of the slurry.

The metal hydride is typically a reversible metal hydride, e.g., a reversible metal or metal alloy hydride. A reversible hydride former, e.g., a reversible metal hydride former, is anything (e.g., any metal or alloy) that is capable of reacting with hydrogen reversibly to form a hydride (i.e., that is capable of reversibly going from hydride form to non-hydride form, generally depending on conditions to which the slurry is subject). The reaction, in a simple form, involves bringing gaseous hydrogen in contact with the hydride former. In the case of a metal hydride former, this reaction can be represented as follows:

$$M + x/2 H_2 \leftrightarrow MH_x$$

where M is the metal hydride former and X is the number of hydrogen atoms in the final hydride product. This reaction is sometimes described as an adsorption process rather than a bonding process.

The reaction direction is determined by the pressure of the hydrogen gas and/or the temperature of the reaction. In some examples in which magnesium hydride is utilized, a temperature of from about 250° C. to about 400° C. (e.g., from about 280° C. to about 350° C. or from about 290° C. to about 320° C.) is required for the hydriding of the metal, while a temperature of from about 280° C. to about 400° C. (e.g., from about 300° C. to about 380° C., from about 320° C. to about 360° C., or from about 310° C. to about 340° C.) results in dehydriding of the metal. Other hydrides can operate with significantly reduced temperatures and pressures, e.g., absorption and desorption temperatures of no more than about 250° C. (e.g., no more than about 225° C., no more than about 200° C., no more than about 175° C., no more than about 150° C., no more than about 125° C., no more than about 100° C., or no more than about 80° C.). In certain embodiments, alloys and/or mixtures of hydrides may improve both the kinetics and the temperature ranges of use. Examples of such are provided below. Generally, for the hydriding of the metal, an increase in the hydrogen pressure results in a faster hydriding reaction and/or a lower temperature requirement for hydriding. In some cases, the hydrogen pressure is at least about 15 psia (e.g., at least about 50 psia, at least about 100 psia, at least about 150 psia, at least about 200 psia, or at least about 250 psia) and/or at most about 300 psia (e.g., at most about 250 psia, at most about 200 psia, at most about 150 psia, at most about 100 psia, or at most about 50 psia). The pressure will generally be partially dependent upon the temperature (and vice-versa). For example, while magnesium hydride slurries produce a relatively rapid absorption of hydrogen at 300° C. at a pressure of 150 psia, a lower temperature might provide a faster reaction.

Generally, a fast reaction is desirable to reduce costs. During absorption, however, heat is produced and must be removed from the system. High rates of heat release could potentially decompose the oil in the slurry. In certain embodiments, a combination of temperature and pressure parameters can be used to control the direction and speed of the reaction, and thus the heat produced. For example, the pressure can be initially relatively low, and can then be increased as the process proceeds.

As the hydride reaction is reversible, a slurry of a hydride former can function to transport energy in the form of hydrogen repeatedly, being charged and discharged many times (e.g., at least about 5 times, at least about 10 times, at least about 20 times, at least about 25 times, at least about 50 times, at least about 75 times, at least about 100 times, at least about 125 times, at least about 150 times, at least about 250 times, at least about 500 times, at least about 1000 times, or at least about 2000 times). Generally, the greater the number of charge/discharge cycles, the more cost-effective the system. For example, at large scale, a chemical hydride slurry used in a non-reversible fashion (e.g., in which the hydrogen is evolved by mixing a metal hydride with water to form hydrogen and a metal hydroxide; such are disclosed in, for example, U.S. application Ser. No. 10/044,813, titled Storage, Generation, and Use of hydrogen, filed on Nov. 14, 2002, and incorporated herein by reference) should be able to deliver hydrogen at a cost of about $4/kg of hydrogen. If a reversible magnesium hydride slurry carried only half as much hydrogen at the delivery point, the cost of hydrogen for a single use would be about $8/kg of hydrogen. If the reversible magnesium hydride slurry can be cycled 100 times, however, the cost of the hydrogen will drop to approximately the cost of the hydrogen used in the slurry and the cost of the transportation of the slurry (e.g., $1.65+$0.10+$8/100=$1.83/kg). Any reuse of the hydride slurry in a reversible system will reduce the cost of the hydrogen. In certain examples, a limiting factor on the number of times the slurry can be charged and discharged is the slow formation of the oxide or hydroxide form of the chemical hydride former, e.g., due to exposure to atmospheric moisture or air. Another issue that might limit the life of a metal hydride slurry might be damage to the oils and dispersants. These issues can influence how often the hydride slurry must return to the factory to be recycled. To recycle the hydride slurry, the oils are first separated from the solids. Then the solids are reformed to pure metals. Then the metals are alloyed to form fresh hydride former and the fresh hydride former is reacted with hydrogen to form fresh hydride slurry.

Generally, any reversible hydride former would be suitable, including metal and/or metal alloy hydride formers, such as, for example, magnesium, vanadium, FeTi, CaNi$_5$, MgNi$_2$, NaAl or other metal hydride formers whether an elemental metal, metal alloy or intermetallic material. Intermetallic hydride formers include LaNi$_{4.5}$Al$_{0.5}$, LaNi$_5$ and TiFe$_7$ Mn$_2$. Metallic hydride formers include the transition metals (periodic table Groups IIIA to VIIIA), including the lanthanide and actinide series. They have a large capacity for hydrogen storage coupled with ready release of hydrogen at moderate temperatures and pressures and an ability to undergo many cycles of absorption and desorption with little decrease in capacity.

Metals and metal alloys known to form reversible hydrides for reversibly capturing hydrogen include titanium alloys as set forth in U.S. Pat. No. 4,075,312, lanthanum alloys as disclosed in U.S. Pat. No. 4,142,300, and other alloys as shown in U.S. Pat. No. 4,200,623. Elemental metals known to form metal hydrides are described in "Metal Hydrides" by W. M. Mueller, J. P. Blackledge and G. G. Libowitz, Academic Press, N.Y. 1968. These patents and references are incorporated here by reference.

The slurry is initially formed by adding a reversible hydride former and optionally a dispersant to a carrier liquid. The reversible hydride former is generally finely ground before being mixed with the other components of the slurry. In some cases, the reversible hydride former powder is first combined with a mixture of the mineral oil and dispersant, which is then ground (e.g., in a grinder or mill) to further reduce the size of the particles. In some cases, the final particles are primarily from about 1 microns to about 200 microns (e.g., from about 1 microns to about 100 microns or from about 1 micron to about 50 microns) in size across their smallest dimension. In some cases, a small amount of hydride (e.g., a hydride that includes the same reversible hydride former being added to the slurry) is added to the slurry prior to charging the slurry. The amount of hydride added to the hydride former in some embodiments is from about 1% to about 50% (e.g., from about 3% to about 20%). The most cost effective range will typically depend on the reaction rate and the cost of the hydride former. For magnesium hydride, the hydride can function as a catalyst, increasing the rate of hydride formation by the reversible hydride former, for example, as described in U.S. Pat. No. 5,198,207, incorporated herein by reference. In some cases, such as when the depleted slurry is one that had been charged and had since been discharged, it has been hypothesized that some of the hydride remains in hydride form and provides the catalyst function without the need for the addition of a chemical hydride as a catalyst.

Examples of the slurries can have a liquid-like flow characteristic that can allow for the use of existing liquid fuel infrastructure in the storage and transportation of the slurry. The nature of the carrier liquid, the amount of the dispersant, and the size of the hydride particles all affect the viscosity of the slurry. The oil in the slurry can protect the hydride from unintentional contact with moisture in the air. The slurry can serve as a path for the dissipation of heat generated from the exothermic charging reaction. The dispersant maintains the hydride particles in suspension. The dispersant attaches to the particles and fends off adjacent particles to prevent agglomeration of the particles.

The slurry burns only if high heat is applied, as by a blow torch, and maintained. Upon removal of heat, the burning of the slurry ceases and flames die out.

The slurry is generally capable of holding between about 3% and about 6% by weight of hydrogen. The slurry in some embodiments can absorb up to 100% of the theoretical amount of hydrogen that can be absorbed. The slurry in certain embodiments can release from about 70% to about 98% of the uptaken hydrogen (e.g., from about 80 to 98% or from 90 to 98% of the uptaken hydrogen). The residual hydride that remains can then function as a catalyst for the recharging of the slurry.

The charging device includes a slurry-holding vessel and a heating device (e.g., heating coils, a heat exchanger, a heating plug, and/or a counter flow heat exchanger) for heating the slurry therein to the charging temperature. The charging device also includes a hydrogen gas inlet and optionally a pressure regulator for maintaining the charging pressure within the vessel. As the charging reaction is exothermic, the charging device may include a heat removal apparatus (e.g., a heat pump, heat exchanger, and or a plug) for maintaining the slurry being charged within a desired temperature range. The charging device can also include stirring or mixing components to create a more uniform temperature distribution throughout the slurry and to assist in the distribution of hydrogen throughout the slurry.

The charging device can be supplied with freshly created slurry, depleted slurry or a combination of the two.

In some examples, such as in FIG. 1, the charging device operates on a batch-by-batch basis. Depleted slurry is pumped into the device, which is heated and supplied with hydrogen gas until the slurry is charged. The pressure is vented, the slurry is cooled, and the slurry is pumped from the device (e.g., to a storage tank). The process is then repeated.

In other implementations, the charging device operates continuously as slurry is continuously pumped, heated, charged, cooled and removed.

Figure 2:
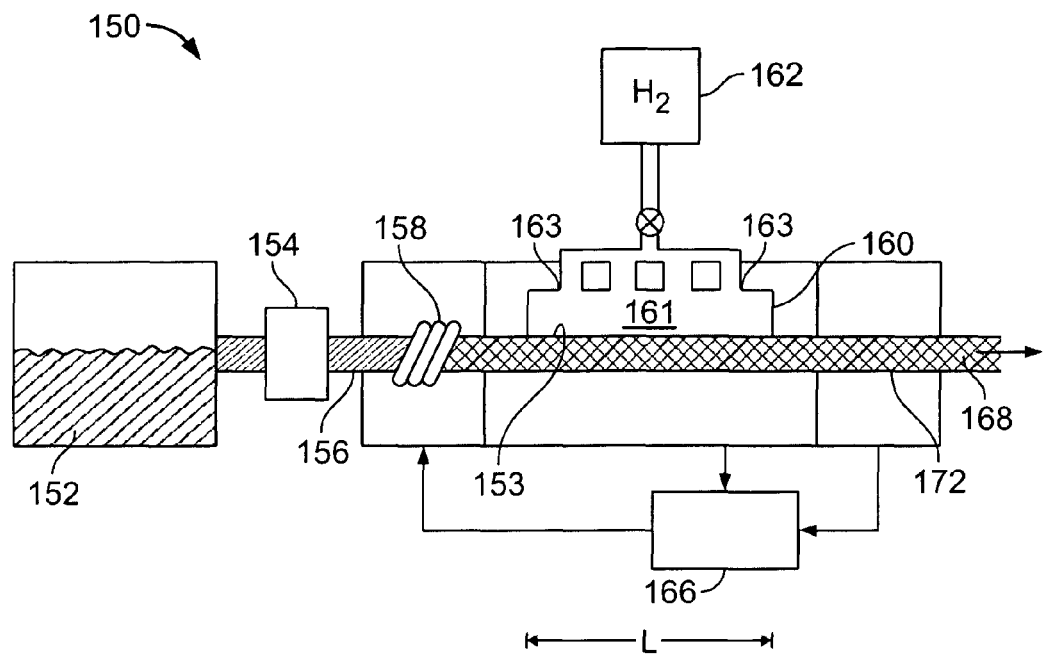
FIG. 2 is a schematic diagram of a metal hydride charging device.

As shown in FIG. 2, in a continuous-mode charging apparatus 150, depleted metal hydride slurry 152 is fed by a pump 154 into a first section of tubing 156, where it is heated to the charging temperature by heating coils 158. Once heated, the depleted metal hydride is pumped into a pressure chamber 160 having a headspace 161 located above the slurry 152. Hydrogen gas 162 is introduced via gas inlets 163 into the headspace 161, where it is in direct contact with a surface 153 of the slurry 152. The hydrogen gas 162 is introduced under pressure sufficient, given the temperature selected, to initiate the hydride reaction. The pressure chamber 160 is of a length l sufficient, when combined with the flow rate of the slurry, to result in a lag time of the slurry in the pressure chamber 160 sufficient for substantially complete charging of the slurry. As the metal in the depleted metal hydride slurry 152 is hydrided to form a charged metal hydride slurry 168, heat is given off by the slurry. An optional heat exchanger 166 collects and transfers heat from the slurry to the first section of tubing 156, where it assists in the heating of the depleted metal hydride slurry. Once the slurry is fully charged, it exits the pressure chamber 160 and enters a third section of tubing 172, in which it is cooled to about room temperature, e.g., by the heat exchanger 166. The charged metal hydride slurry is then pumped out of the charging device 150.

In a variation of this arrangement, the process could be started by pumping some discharged slurry through a counter flow heat exchanger and then through a heater (that would raise the temperature of the discharged slurry to operating temperature until there is enough heat from the charged slurry leaving the charging section) and then into the charging volume where hydrogen will contact the slurry. A reaction between the depleted hydride and the hydrogen will produce heat, some of which must be removed actively to maintain the slurry temperature at the desired reaction temperature. After being in the hydriding section for a couple hours, the hydriding should be complete and the charged hydride slurry will pass back through the counter flow heat exchanger and into a separate container for the charged slurry. The hot slurry passing through one side of the counter flow heat exchanger will lose its heat to the cold depleted slurry passing through the other side of the counter flow heat exchanger.

Generally, the discharge device is similar to the charging device. The discharge device generally includes a fluid-holding vessel and a heating device (e.g., heating coils, a heat exchanger, and/or a heating plug) for heating the slurry therein to the discharging temperature. Where magnesium hydride is utilized, the discharging temperature can be at least about 280° C. (e.g., at least about 300° C., at least about 320° C., at least 340° C., at least about 350° C., at least about 360° C., at least about 370° C., at least about 380° C., or at least about 390° C.) and/or at most about 400° C. (e.g., at most about 390° C., at most about 380° C., at most about 370° C., at most about 360° C., at most about 350° C., at most about 340° C., at most about 320° C., or at most about 300° C.). Other hydrides can operate with reduced temperatures and pressures. The device further includes a hydrogen gas outlet for releasing hydrogen gas from the vessel. The discharge device optionally further includes a heat removal apparatus (e.g., a heat pump, heat exchanger, or an insulated counter flow heat exchanger) for reducing the temperature of the slurry once it is depleted of releasable hydrogen.

In some examples, such as in FIG. 1, the discharge device operates on a batch-by-batch basis. Charged slurry is pumped into the device and heated, at which time hydrogen evolves from the slurry. The depleted slurry is then optionally cooled and pumped from the device (e.g., to a storage tank). The process is then repeated.

Figure 3:
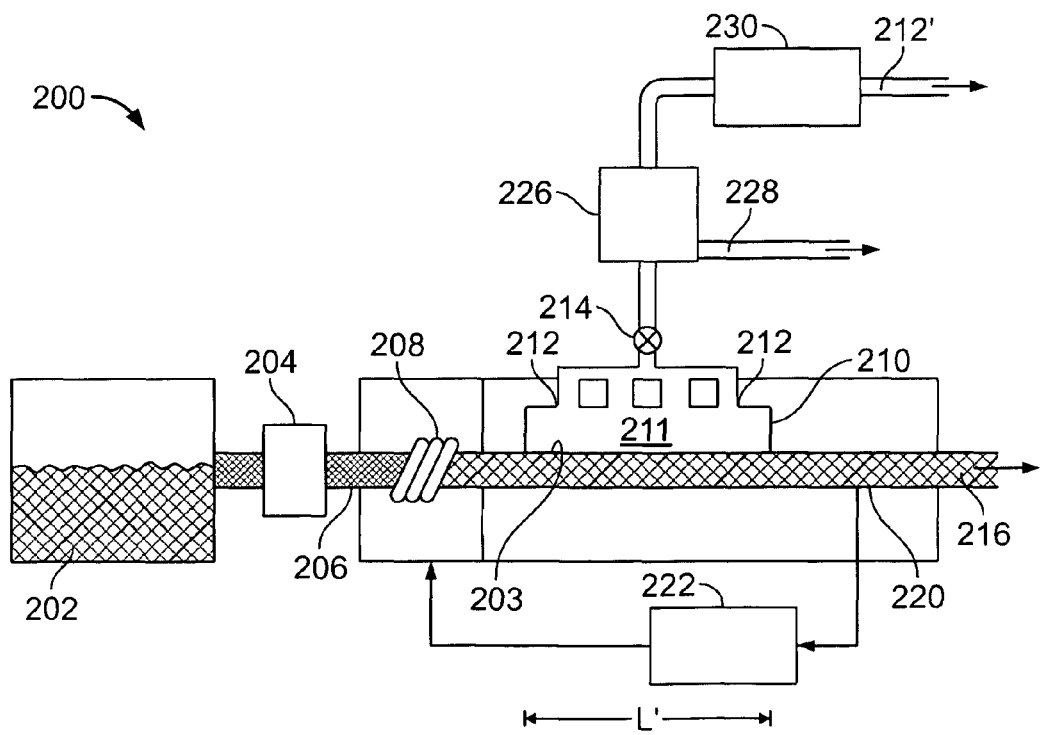
FIG. 3 is a schematic diagram of a metal hydride discharging device.

In some examples, charged slurry is continuously pumped into the discharge device, heated, depleted, cooled and removed. FIG. 3 illustrates an example of a continuous-mode discharge device 200, in which charged metal hydride slurry 202 is fed by a pump 204 into a first section of tubing 206, where it is heated to the desorption temperature using heating coils 208. Once heated, the charged metal hydride slurry 202 passes into a desorption chamber 210 having a headspace 211 above a surface 203 of the slurry 202. Hydrogen gas 212 desorbes from the charged slurry 202 into the headspace 211, from which it is vented via gas outlets 212. A pressure valve 214 can be used to control the pressure within headspace 211. The length l' of the desorption chamber 210 tubing is sufficient, when taken in combination with the flow rate of the slurry, to permit substantially all of the available hydrogen to desorb. The slurry, which is now a depleted metal hydride slurry 216, exits the desorption chamber 210 and enters a third section of tubing 220, in which it is cooled to about room temperature, optionally by means of a heat exchanger 222 which takes the heat from the depleted metal hydride slurry 216 and applies it to the charged metal hydride slurry 202 entering the discharge device 200. The depleted metal hydride slurry 216 is then pumped out of the discharge device 200, e.g., for storage and/or transport.

The pressure valve 214 can in some cases be coupled to a cooling system 226 to cool the hydrogen gas 212 and to condense any oils 228 which had volatilized and vented along with the hydrogen gas 212. Any oil 228 so condensed could be added back into the depleted metal hydride slurry 216. The hydrogen gas 212 can in some cases be run through a filter 230, e.g., a charcoal filter, to remove any remaining oils or other impurities. The now purified hydrogen gas 212' can then be fed to further processing, such as, for example, bottling. Alternatively, the hydrogen gas 212' can be supplied to a hydrogen-consuming process such as a fuel cell or a welding system.

Generally, a first energy source is used to form or extract the hydrogen that is stored in the hydride slurry. The first energy source is in certain examples an energy source that is readily available at a particular location (e.g., a first location) and/or is not readily available at, and/or not readily transferable to, a second location. Such energy sources include renewable energy sources such as, e.g., wind, geothermal, hydroelectric, ocean power (e.g., drawing on the energy of ocean waves, tides, or on the thermal energy stored in the ocean), biomass, and solar energy in the form of heat or electricity. Such energy sources generally do not produce greenhouse gases and are not subject to depletion. Biomass can produce greenhouse gases, but typically does not contribute substantial amounts of additional greenhouse gases to the atmosphere, since the biomass uses the greenhouse gases to make itself. In some embodiments, nuclear energy can be utilized to produce hydrogen. In other embodiments, fuels generally utilized as energy sources (e.g., coal, oil, and/or natural gas) can be utilized to produce hydrogen. The hydrogen can be produced at a small number of locations, where care can be taken to reduce pollution resulting from the burning of such fuels.

Many of these energy sources are not themselves easily transportable in an unused and/or stable form, in contrast to fossil fuels. In addition, many of these energy sources are in locations in which the energy demand is low (e.g., areas of low population density and/or little industrialization). For example, as illustrated in FIG. 1, the first location 12, Kansas, has an abundance of wind energy available, but little demand for energy as compared with other parts of the country. In some locations, the available energy is greater than the energy demand. This excess energy can be stored and transported to locations of higher energy demand.

EXAMPLE 1

A mixture of 50 wt % magnesium hydride and Paratherm NF heat transfer oil was placed in a Parr autoclave, where it was subjected to the following experimental conditions. A plot of both temperature and pressure of the autoclave as a function of time is found at FIG. 4.

The autoclave was purged with hydrogen five times at a pressure of 150 psia to reduce the oxygen content of the gas in the vessel to no more than about 2 ppm. The pressure in the vessel was reduced to atmospheric pressure after each pressurization and after final pressurization. The vessel was heated to 140° C., a temperature at which any water in the oil would have reacted with the magnesium hydride to form hydrogen. The resulting pressure rise would have caused the produced hydrogen to leave the vessel and be collected in an inverted bottle filled with water; no bubbles were observed, indicating that no water was present in the oil.

The vessel was heated to 370° C., a temperature at which hydrogen desorbs from magnesium hydride, and hydrogen was seen to evolve for a period of about 2 hours, during which time about 80% of the hydrogen theoretically bound in the magnesium hydride was evolved. The hydrogen evolved was measured in an inverted bottle that displaced water in the bottle.

The autoclave was then pressurized with hydrogen gas at 150 psia, while the temperature was held at about 370° C. The pressure dropped only a few psi over the course of 1.4 hours, indicating that little hydrogen was absorbed by the slurry. The temperature was then reduced to about 320° C. At this temperature hydrogen was readily absorbed (i.e., was readily incorporated into magnesium hydride). The system was held at this condition for 1.5 hours, with one additional hydrogen pressurization, and was then cooled.

Figure 4:
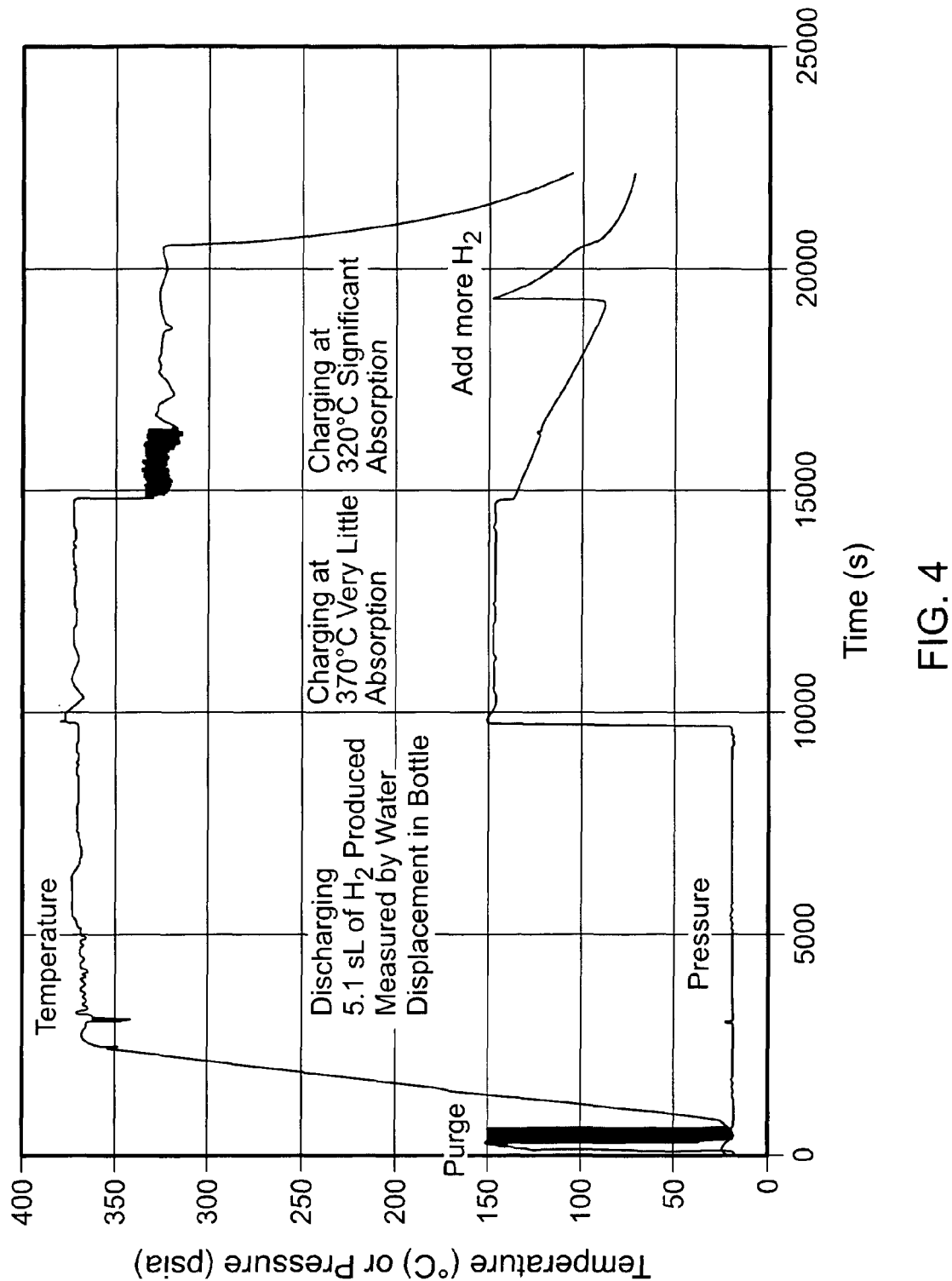
FIG. 4 is a plot of temperature and pressure versus time for charging and discharging a metal hydride slurry.

As can be seen in the graph of FIG. 4, when initially heated to about 370° C., the slurry did not evolve hydrogen (indicated by the pressure of nearly 0 psia). A set amount of hydrogen was introduced, indicated by the increase in pressure to about 150 psia at about 10000 seconds. At this temperature and pressure, the slurry did not absorb the hydrogen (indicated by the pressure remaining at about 150 psia over time). Once the temperature was reduced to the absorption temperature of about 320° C., the pressure fell, indicating that hydrogen was being absorbed by the slurry. The rate of the pressure drop increased over time. This is believed to be a function of the initially-formed magnesium hydride acting as a catalyst, speeding the hydride reaction and utilizing the hydrogen at a more rapid pace. Upon adding more hydrogen to the system (indicated by the spike in pressure at about 18000 seconds), the rate or pressure drop (indicative of the rate of hydrogen uptake) increased again, tailing off only as the temperature was reduced at the end of the experiment.

While embodiments described above refer generally to forming hydrogen at or near the site of metal hydride formation or charging, hydrogen can itself be stored and transported to metal hydride charging sites. For instance, hydrogen can be transported from large scale steam methane reformers to remote markets (e.g., markets several hundred miles away).

Other embodiments are within the scope of the following claims.

What is claimed is:

1. A method comprising:
    pumping a pumpable hydrogen storage fluid into a discharge device, the pumpable hydrogen storage fluid comprising an inert liquid and reversible hydride formers, the reversible hydride formers comprising hydrided reversible hydride formers, the pumpable hydrogen storage fluid not being subject to significant hydrogen evolution at room temperature and pressure, wherein the pumpable hydrogen storage fluid is a slurry; and heating the pumpable hydrogen storage fluid under anhydrous conditions in the discharge device to release hydrogen from the hydrided reversible hydride formers and form non-hydrided reversible hydride formers.

2. The method of claim 1, wherein the discharge device designed to exclude oxygen and water.

3. The method of claim 1, wherein the non-hydrided reversible hydride formers can be rehydrided by combining the pumpable hydrogen storage fluid with hydrogen gas under pressure.

4. The method of claim 1, wherein eighty percent or more of the reversible hydride formers of the pumpable hydrogen storage fluid are hydrided reversible hydride formers when the pumpable hydrogen storage fluid is pumped into the discharge device.

5. The method of claim 2, wherein eighty percent or more of the reversible hydride formers of the pumpable hydrogen storage fluid are non-hydrided reversible hydride formers after the pumpable hydrogen storage fluid is heated to release the hydrogen.

6. The method of claim 1, wherein the non-hydrided reversible hydride formers comprises a metal or a metal alloy.

7. The method of claim 6, wherein the non-hydrided reversible hydride formers are magnesium metal.

8. The method of claim 1, wherein the hydrided reversible hydride formers are metal hydrides.

9. The method of claim 8, wherein the metal hydrides are magnesium hydride.

10. A method comprising:
pumping a pumpable hydrogen storage fluid into a discharge device, the pumpable hydrogen storage fluid comprising an inert liquid and reversible hydride formers, the reversible hydride formers comprising hydrided reversible hydride formers, the pumpable hydrogen storage fluid not being subject to significant hydrogen evolution at room temperature and pressure, wherein the pumpable hydrogen storage fluid comprises magnesium, magnesium hydride, mineral oil and a dispersant; and heating the pumpable hydrogen storage fluid under anhydrous conditions in the discharge device to release hydrogen from the hydrided reversible hydride formers and form non-hydrided reversible hydride formers.

11. The method of claim 1, wherein the pumpable hydrogen storage fluid comprises a dispersant selected from the group consisting of triglyceride, polyacrylic acid, oleic acid, and combinations thereof.

12. The method of claim 1, further comprising hydriding the reversible hydride formers in the pumpable hydrogen storage fluid prior to pumping the pumpable hydrogen storage fluid into the discharge device.

13. The method of claim 12, wherein hydriding the reversible hydride formers comprises generating hydrogen using electricity or heat and combining the hydrogen with the pumpable hydrogen storage fluid under pressure in a charging device.

14. The method of claim 13, wherein combining the hydrogen with the pumpable hydrogen storage fluid comprises heating the pumpable hydrogen storage fluid to at least about 250° C.

15. The method of claim 14, wherein combining the hydrogen with the pumpable hydrogen storage fluid comprises heating the pumpable hydrogen storage fluid to a temperature of no more than about 350° C.

16. The method of claim 14, wherein combining the hydrogen with the pumpable hydrogen storage fluid comprises maintaining a pressure of at least about 150 psia.

17. The method of claim 14, wherein the charging device is at a first location and the discharge device is at a second location and the first location is remote from the second location.

18. The method of claim 1, further comprising utilizing the released hydrogen as an energy source.

19. The method of claim 1, wherein heating the pumpable hydrogen storage fluid under anhydrous conditions in the discharge device comprises heating the slurry to at least about 250° C.

20. The method of claim 1, wherein the discharge device is in a vehicle and the released hydrogen is uses as an energy source for the vehicle.

21. The method of claim 1, wherein the slurry comprises a suspension of the reversible hydride formers within mineral oil.

22. The method of claim 1, wherein the pumpable hydrogen storage fluid includes a concentration of between 40 weight percent and 80 weight percent of the reversible hydride formers.

* * * * *

UNITED STATES PATENT AND TRADEMARK OFFICE
CERTIFICATE OF CORRECTION

PATENT NO. : 7,790,013 B2
APPLICATION NO. : 11/392149
DATED : September 7, 2010
INVENTOR(S) : Andrew W. McClaine and Kenneth Brown It is certified that error appears in the above-identified patent and that said Letters Patent is hereby corrected as shown below:

Column 16, Line 38, Claim 20, delete "uses" and insert --used-- therefor.

Signed and Sealed this

Twenty-first Day of December, 2010

David J. Kappos
*Director of the United States Patent and Trademark Office*